Nov. 2, 1926.  
W. J. LAGUNA ET AL  
1,605,668  
STAY FOR FENCES AND THE LIKE  
Filed Oct. 30, 1924
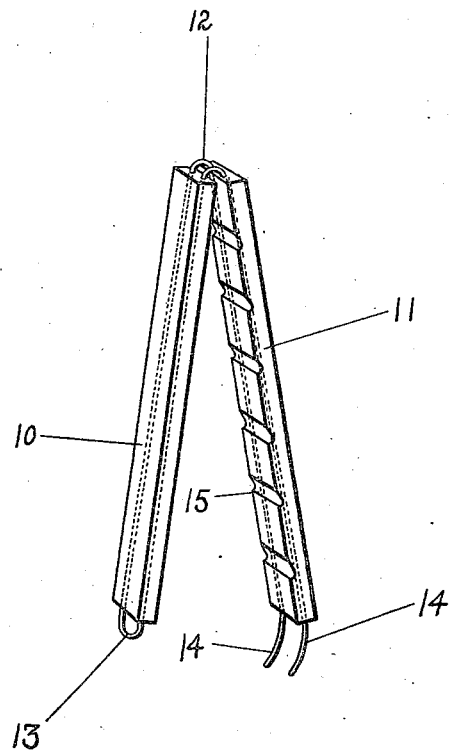
Inventors  
Washington Jacinto Laguna,  
Juan Santiago Torrent, and  
Pedro Torrent  
By  
Emil Bönnelycke  Attorney Patented Nov. 2, 1926.

1,605,668

UNITED STATES PATENT OFFICE.

WASHINGTON JACINTO LAGUNA, JUAN SANTIAGO TORRENT, AND PEDRO TORRENT, OF BUENOS AIRES, ARGENTINA.

STAY FOR FENCES AND THE LIKE.

Application filed October 30, 1924, Serial No. 746,805, and in Argentina June 18, 1924.

Our present invention relates to certain improvements in intermediate stays for fences and the like its object being to provide a particular construction thereof which considerably facilitates the placing of the wires or wire net.

Our invention essentially consists in constructing the posts, stays and the like out of two parts or portions between which the wire or wire-net is imprisoned and in providing means for securing the two parts together. In the case of stays to be used in fences it should be convenient to form on one or both of the inner surfaces of the two parts a rebate so that the wire may be guided and held thereby.

The stays according to our present invention may be of any suitable material.

In order that our present invention may be clearly understood and easily carried into practice, a preferred embodiment thereof has been shown in the appended drawing wherein—

The single figure is a side view of a stay in its open position and arranged to be used in combination with wire fences.

Similar characters of reference denote same or like parts thruout the said figure.

In the embodiment shown, the stay consists of two halves or sections 10 and 11 suitably articulated or hinged at one of their ends 12, by means of a U bent wire which is a part of the inner reinforcement and which protrudes at the opposite end of the stay as shown in 13, while the free ends thereof protrude through the other end of the stay as shown in 14. The wires 14 are passed through the loop 13 and are suitably fixed together by twisting or otherwise, after the wire or wire net has been introduced between the two portions of the stay. The contacting surfaces of the stay may be plain or recessed as shown at 15.

It is obvious that many constructional and other changes may be introduced without departing from the scope of our present invention which has been clearly set forth in the appended claiming clauses.

Having now fully described and ascertained the nature of our present invention and in what manner the same is to be carried into practice, we declare that what we claim and desire to protect by Letters Patent is:

1. A fence stay comprising a pair of sections, one of said sections having recesses therein for the reception of wires; and a reinforcement in said sections hingedly interconnecting them together at one end and adapted to secure the other ends of the sections after the wires have been inserted.

2. A fence stay comprising a pair of sections adapted to receive and retain wires in place; and a reinforcement in said sections hingedly interconnecting them together at one end and adapted to secure the other ends of the sections after the wires have been inserted.

3. A fence stay comprising a pair of sections adapted to receive wires; and a U-shaped reinforcement in said sections hingedly interconnecting them together at one end and adapted to secure the other ends of the sections after the wires have been inserted.

In witness whereof, we have hereunto signed our names.

WASHINGTON JACINTO LAGUNA.
JUAN SANTIAGO TORRENT.
PEDRO TORRENT.